United States Patent [19]

Ueda

[11] Patent Number: 4,783,387

[45] Date of Patent: Nov. 8, 1988

[54] PHOTOSENSITIVE MEMBER COMPRISING DISAZO PIGMENT

[75] Inventor: Hideaki Ueda, Kawanishi, Japan

[73] Assignee: Minolta Camera Kabushiki Kaisha, Osaka, Japan

[21] Appl. No.: 105,249

[22] Filed: Oct. 7, 1987

[30] Foreign Application Priority Data

Oct. 9, 1986 [JP] Japan ............................. 61-240704

[51] Int. Cl.$^4$ ............................................. G03G 5/06
[52] U.S. Cl. ..................................... 430/76; 430/78; 430/79
[58] Field of Search ............................. 430/76, 78, 79

[56] References Cited

U.S. PATENT DOCUMENTS 4,123,270 10/1978 Heil et al. .
4,396,695 8/1983 Dimmler et al. .
4,554,231 11/1985 Ishikawa ........................... 430/78 X
4,631,242 12/1986 Emoto ............................... 430/78 X Primary Examiner—J. David Welsh
Attorney, Agent, or Firm—Burns, Doane, Swecker & Mathis

[57] ABSTRACT

The present invention provides a new photosensitive member, in which a specific disazo pigment is used as a photoconductive material, which is excellent in whole static properties, especially in sensitivity.

7 Claims, No Drawings

PHOTOSENSITIVE MEMBER COMPRISING DISAZO PIGMENT

BACKGROUND OF THE INVENTION

The present invention relates to a photosensitive member which has a photosensitive layer containing a new disazo pigment.

It is known conventionally to use inorganic photoconductive materials such as selenium, cadmium sulfide and zinc oxide as materials constituting photosensitive layers of photosensitive members.

Such photoconductive materials have many advantages, some of which are the capability of being charged to a suitable potential in the dark, the reduced dissipation of the charge in the dark, the fast dissipation of the charge under irradiation of light, and so forth, but, on the other hand, they have various defects. For example, a photosensitive member based on selenium is produced under rigorous manufacturing conditions and at high cost and the product must be handled with care because of susceptibility to heat and mechanical impacts. With respect to the use of cadmium sulfide and zinc oxide for photosensitive members, the products are unable to have long-lasting stability characteristics because the sensitivity cannot be maintained stable in a humid environment and because the colorant added to them as a sensitizer undergoes charge deterioration by corona charging and light fading by exposure to light.

On the other hand, it has also been proposed to use various organic photoconductive polymers including polyvinyl carbazole. These polymers have an advantage over the above-mentioned inorganic photoconductive materials in coating property and lightness, but the polymers are still inferior to the inorganic materials with respect to sensitivity, durability and stability to change of the environment.

In recent years there have been undertaken active researches devoted to the object of eliminating such defects and solving the problems relating to photosensitive members, through which it has been proposed to introduce a photosensitive member of the function-separating type, produced either as a laminate type or as a dispersion type, whose photoconductive function is separated into the charge-generating function and the charge-transporting function and each of these functions is performed by a material differing from that for the other function. Such a photosensitive member of the function-separating type permits the functional materials to be selected from a wide variety of potential materials so that a highly efficient photosensitive member can be obtained by combining most suited functional materials with respect to electrophotographic properties such as charging properties, sensitivity, residual potential, repeating properties, and printing resistance. Such a photosensitive member can be provided at a low cost because the coating method that applies to the production lends itself to a very high productivity. Furthermore, such separation of the functions makes it possible to freely control the photosensitive wavelength range where the charge-generating material has been suitably selected. The charge-generating materials useful for this application are known to be organic pigments dyes which include phthalocyanine pigments, cyanine dyes, polycyclic quinone pigments, perylene pigments, indigo dyes, thioindigo, and methine squarelate dyes.

However, it has been difficult to obtain a photosensitive member of the function-separating type which satisfies the requirements in static properties as a whole. With respect to sensitivity, too, such a photosensitive member has been unsatisfactory and much remains to be improved.

SUMMARY OF THE INVENTION

The object of the present invention is to provide a photosensitive member which is excellent in static properties as a whole and especially in sensitivity.

In order to provide such properties on the photosensitive member in the present inveniton a photosensitive layer contains a disazo pigment which is expressed by the following general formula (I)

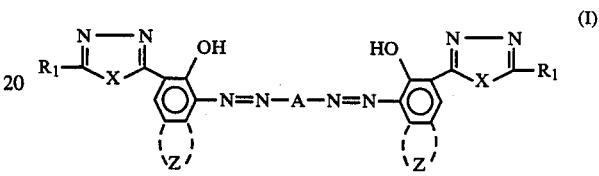

wherein: A represents an aromatic hydrocarbon group or heterocyclic group, which can be formed in a bond by means of a bonding group; Z represents a residual group which forms a polycyclic bond group/heterocyclic group by condensation with a benzene ring and which can have a substitution group; $R_1$ represents an alkyl group, aryl group or heterocyclic group, each of which can have a substitution group; and X represents a nitrogen atom which can have oxygen, sulfur, and/or a substitution group.

DETAILED DESCRIPTION OF THE INVENTION

The present invention relates to a photosensitive member which has a photosensitive layer on an electroconductive substrate, said photosensitive layer containing a disazo pigment which is expressed by the following general formula (I)

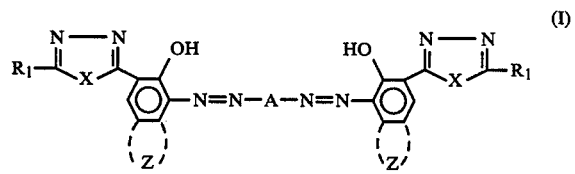

wherein: A represents an aromatic hydrocarbon group or heterocyclic group, which can be formed in a bond by means of a bonding group; Z represents a residual group which forms a polycyclic bond group/heterocyclic group by condensation with a benzene ring and which can have a substitution group; $R_1$ represents an alkyl group, aryl group or heterocyclic group, each of which can have a substitution group; and X represents a nitrogen atom which can have oxygen, sulfur, and/or a substitution group.

By using a disazo pigment, represented by said general formula (I), as the photoconductive substance in a photosensitive member, or by utilizing only the excellent charge-generating ability of a disazo pigment provided by the invention for the charge-generating layer of a photosensitive member of the function-separating type, it is possible to produce a photosensitive member which exhibits an excellent electrophotographic property, i.e., charge retainability, sensitivity, residual potential, etc. and characteristics stable to repeated use.

The symbol A among the compounds in the general formula (I) represents an aromatic hydrocarbon group or heterocyclic group, which can be formed in a bond by means of a bonding group, examples of the aromatic hydrocarbon being benzene ring, diphenyl ring, anthraquinone ring, and fluorenone ring, and examples of the heterocyclic ring being oxazol ring, carbazole ring, and oxadiazole ring.

The symbol $R_1$ represents an aryl group or heterocyclic group, each of which can have a substitution group, the examples being phenyl group, diphenyl group, fluorenyl group, etc. A substitution group, examples of which are lower alkyl group, halogen atom, lower alkoxy group, and nitro group, can be included in the bond.

Inclusion of such a group in the bond helps to improve the dispersibility and the sensitivity of the photosensitive member.

The symbol Z represents a residual group which forms a polycyclic bond group/heterocyclic group by condensation with a benzene ring and which can have a substitution group. Examples of the rings formed with Z are naphthalene, anthracene, dibenzofuran, and benzocarbazole.

The symbol X represents a nitrogen atom which can have oxygen, sulfur, and/or a substitution group, so that the presence of these atoms makes it possible to adjust the spectral sensitivity.

A compound represented by the general formula (I) in the present invention can be easily synthesized by an ordinary method.

For the synthesis, a diamino compound expressed by the general formula (II)

$$H_2N-A-NH_2 \qquad (II)$$

wherein A has the same meaning as in the general formula (I), is tetrazotized with sodium nitrite and hydrochloric acid, and then by coupling of the tetrazotized product with a suitable coupling component represented by the general formula (III) mentioned below, in the presence of an alkali, a compound desired is obtained. Another method of the synthesis is to tetrazotize a diamino compound and then the tetrazotized product is made to undergo isolation in the form of salt by addition of an acid such as $HBF_4$, and by subsequent coupling a compound desired is obtained.

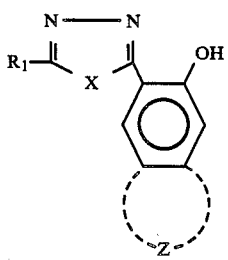

(III)

wherein the symbols $R_1$, X and Z have the same meanings as in (I). A coupling component expressed by the general formula (III) can be easily synthesized by an ordinary method. For the synthesis, a hydrazide compound expressed by the general formula (IV) is acylated or benzoylated with an acid chloride, which may have resulted from substitution as the case may be, and formed into a condensed ring.

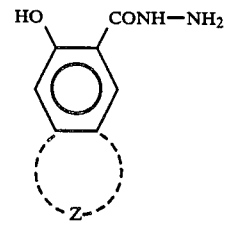

Formularized next are the coupling components applicable to the invention, to which the selection is not restricted, however.

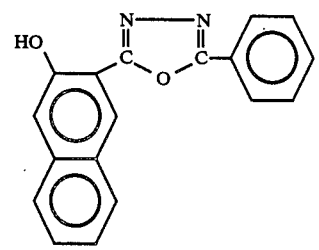

1.

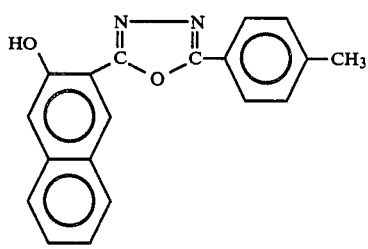

2.

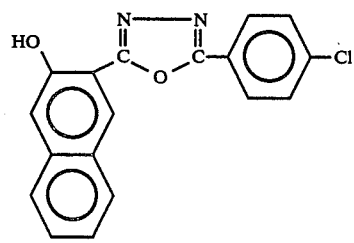

3.

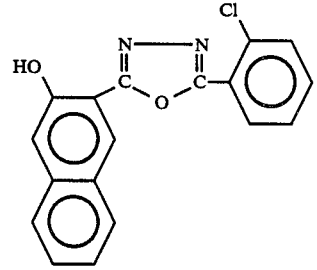

4.

5.
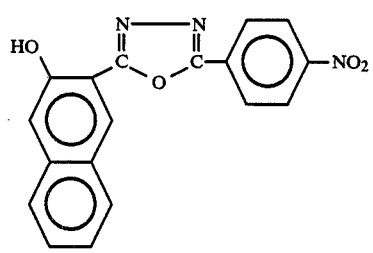
6.
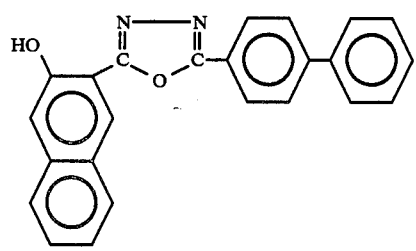
7.
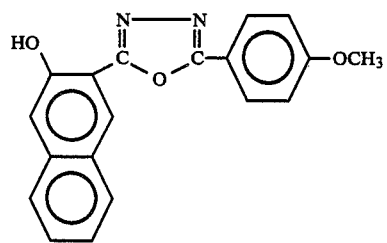
8.
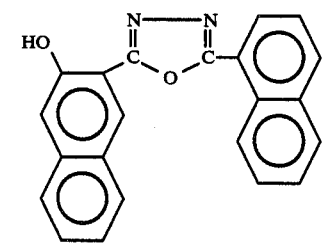
9.
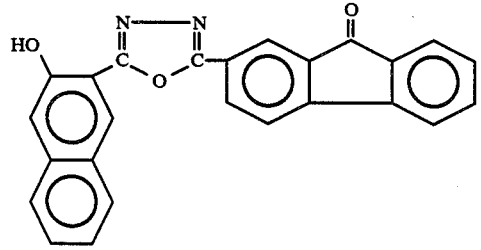
10.
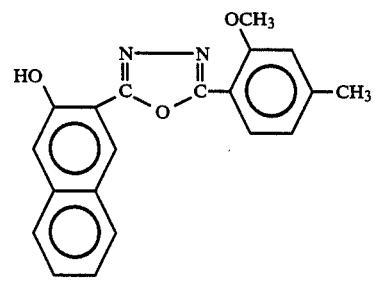
11.
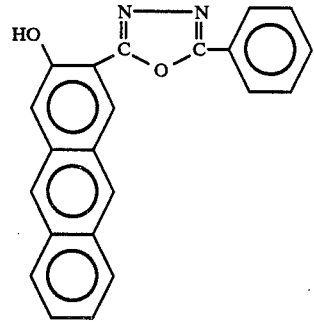
12.
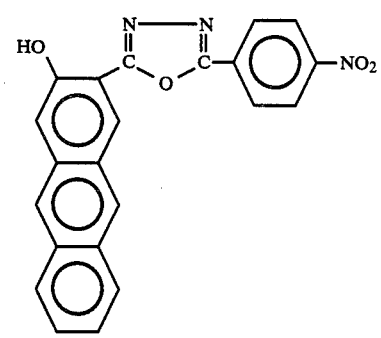
13.
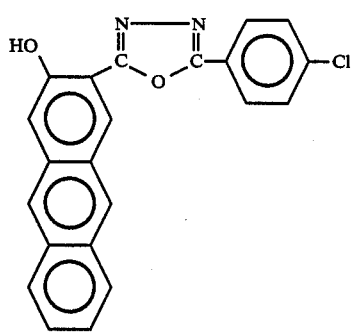
14.
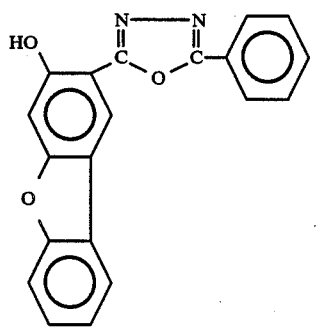
15.
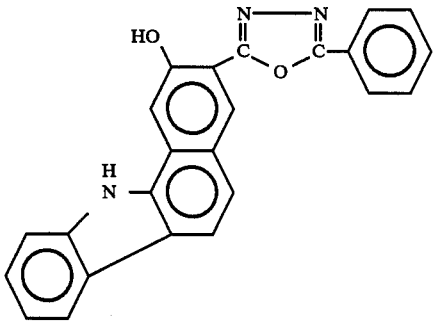

16.
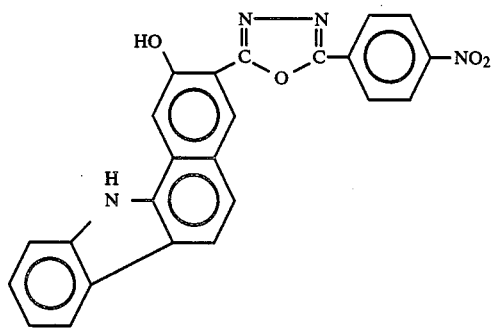
17.
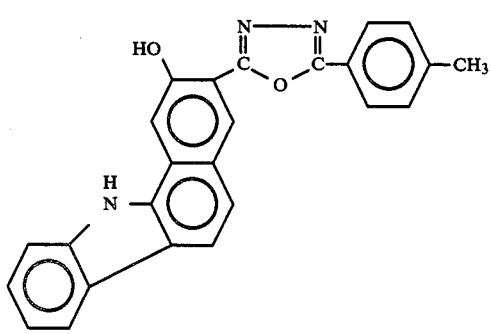
18.
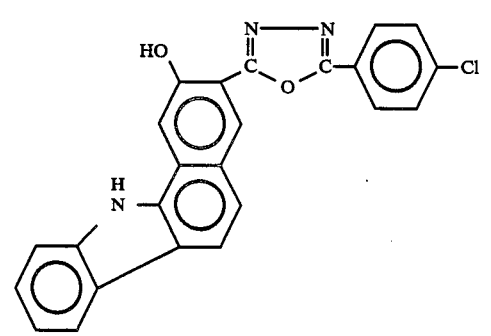
19.
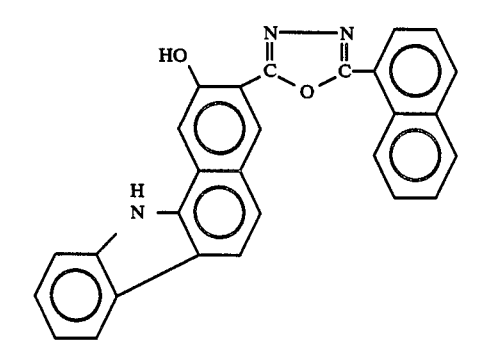
20.
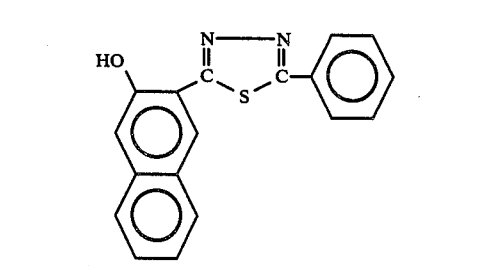
21.
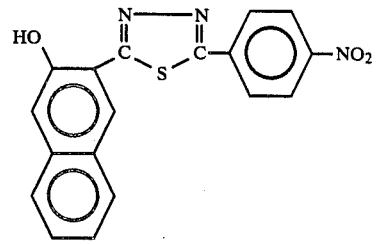
22.
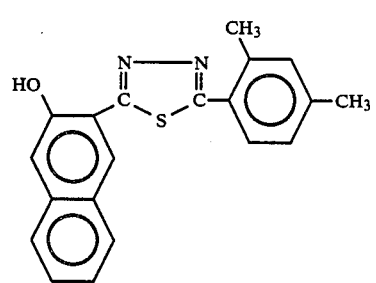
23.
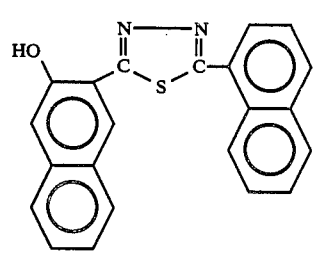
24.
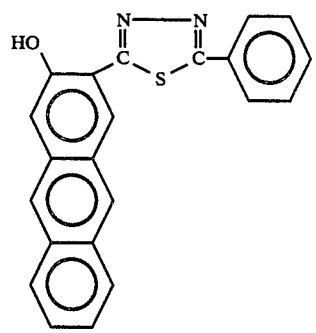
25.
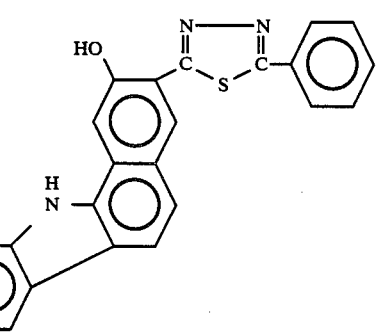

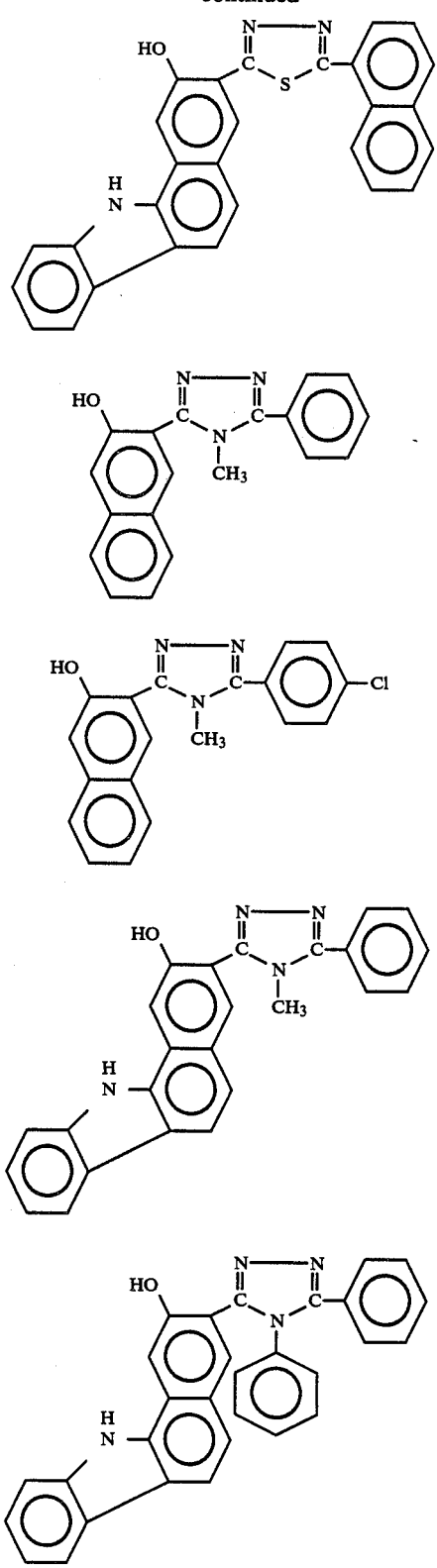

A method of the production for a compound using the coupling component 1 is as follows. Other compounds expressed by the general formula (I) can be produced in a manner similar thereto.

EXAMPLE OF SYNTHESIS I 2.53 g of 3,3'-dichlorobenzidine (0.01 mol) was dispersed in 100 ml of hydrochloric acid and the liquid was cooled to a temperature of 5° C. with stirring. A water solution prepared by dissolving 1.4 g of sodium nitrite in 20 ml of water was added to the liquid dropwise, and, after the addition, the liquid was stirred continuously under cooled condition for another one hour. Subsequently, the liquid was filtered and then 10 g of borofluoric acid was added to the filtrate obtained. By separating crystals, which were formed by this addition of borofluoric acid, from the liquid by filtration tetrafluoroborate of 3,3'-dichlorobenzidine was obtained.

With 3.49 g of the diazonium salt (0.01 mol) thus obtained as a coupling agent the compound represented in List No. 1 was dissolved in 300 ml of N-methylpyrrolidone and then a solution of 5 g sodium acetate dissolved in 100 ml of water was added dropwise at 10°–20° C. to the solution; the dropping continued for approx. 30 minutes. After the dropping, the solution was stirred at room temperature for three hours and then the crystals separated were obtained by filtration.

The course crystals obtained were dispersed in one liter of DMF, and the solution was stirred at room temperature for three hours. After the stirring, the crystals were separated by filtering again. This step was carried out twice. Subsequently by rinsing in water and drying the crystals, a disazo compound was obtained in a quantity of 7.0 g (yield 86%).

purplish black crystals
elementary analysis

| Elements | C | H | N |
| --- | --- | --- | --- |
| Actual value (%) | 70.38 | 3.44 | 13.70 |
| Calculated value (%) | 70.33 | 3.42 | 13.70 |

A photosensitive member provided by this invention has a photosensitive layer which contains one kind of disazo pigment expressed by said general formula, or two or more kinds of such pigments. There are various types of photosensitive members and this invention is applicable to any type of them. For example, one type of photosensitive member features a monolayer, the substrate being provided thereon with a photosensitive layer which consists of a disazo pigment dispersed in a resin binder or in a charge-transporting medium, and another type of photosensitive member features a laminate, the substrate being provided thereon with a charge-generating layer consisting primarily of a disazo pigment and said charge-generating layer being overlaid with a charge-transporting layer. A disazo pigment provided by this invention functions as a photoconductive material. When it absorbs light, it generates a charge carrier with a remarkably high efficiency. The charge carrier thus generated can be transported by means of the disazo pigment as a medium, but it is more efficient to have it transported by means of a charge-transporting material as the medium.

To produce a monolayer type photosensitive member, fine particles of a disazo pigment are dispersed in a resin solution or in a solution prepared from a charge-transporting compound and a resin, and the mixture is coated on an electroconductive substrate and dried. The photosensitive layer should have a thickness of 3–30 μm, preferably 5–20 μm. If the quantity of the disazo pigment used is too small, the sensitivity degrades. If this quantity is too large, the chargeability or the mechanical strength of the photosensitive layer may degrade. The pigment in a photosensitive layer must be used in a quantity of 0.01–2 parts by weight, preferably 0.05–1 part by weight, as against 1 part by weight of the resin. The charge-transporting material added where necessary must be used in a quantity of 0.1–2 parts by weight, preferably 0.2–1.2 parts by weight, as against 1 part by weight of the resin. Where the charge-transporting material functions as a binder as well, for example, polyvinyl carbazole is used, it is preferable to use such a disazo pigment in a quantity of 0.01–0.5 parts by weight as against 1 part by weight of a charge-transporting material.

The methods of producting a photosensitive member of the laminate type are as follows. The disazo pigment is applied onto the electroconductive substrate by a technique of vacuum evaporation, or by coating after dissolving the pigment in a solvent such as an amine, or by coating a coating liquid prepared by dispersing the pigment in a suitable solvent, or, where considered necessary, in a solution wherein a binder resin has been dissolved. After drying, the pigment layer is overlaid with a coating of a solution which contains a charge-transporting material and a binder. Drying follows any of these processes. The thickness of the layer of disazo pigment thus produced, which forms a charge-generating layer, must not exceed 4 μm, preferably not exceeding 2 μm, and the thickness of the charge-transporting layer should be within the range 3–30 μm, preferably within the range 5–20 μm. The charge-transporting material in a charge-transporting layer is used in a quantity of 0.2–2 parts by weight, preferable 0.3–1.3 parts by weight, as against 1 part by weight of the binder resin. The use of a high-polymer material for the charge-transporting, which functions as a binder as well, dispenses with any other binder.

The present invention permits the use of plasticizers and sensitizers together with the binder resin in a photosensitive member, examples of such plasticizers being halogenated paraffin, polychloride biphenyl, dimethyl naphthalene, dibutyl phthalate, and O-terphenyl; examples of such sensitizers, particularly of the electron-withdrawing type, being chloranil, tetracyanoethylene, 2,4,7-trinitro, 9-fluorenone, 5,6-dicyanobenzoquinone, tetracyanoquinodimethane, tetrachlorophthalic anhydride, and 3,5-dinitrobenzoate; and examples of other such sensitizers being methyl violet, rhodamine B, cyanine dyes, pyrylium salt, and thiapyrylium salt.

Applicable in this invention as electric-insulative binders are thermoplastic resins and thermosetting resins whose electric insulative properties are already known, photocuring resins, and photoconductive resins. Examples of suitable binders in this application, to which the selection is not restricted, are, among thermoplastic resins, saturated polyester, polyamide, acrylic, ethylene-vinyl acetate copolymer, ion-cross-linked olefin copolymer (ionomer), styrene-butadiene block copolymer, polycarbonate, vinyl chloride-vinyl acetate copolymer, cellolose ester, polyimide, and styrene resin; among thermosetting resins, epoxy, polyurethane, silicone resin, phenolic, melamine, xylene resin, alkyd resin, and thermosetting acrylic; photocuring resins; and, among photoconductive resins, poly-N-vinyl carbazole, polyvinyl pyrene, and polyvinyl anthracene. Such binders can be used each singly or in combination with some of the other binders. It is desirable for any of such electric-insulative resins to have a volume resistance of not less than $1 \times 10^{12} \Omega \cdot cm$, when measured alone.

Applicable as charge-transporting materials in this invention are various compounds such as hydrazone compound, pyrazoline compound, styryl compound, triphenyl methane compound, oxadiazole compound, carbazole compound, stylbene compound, enamine compound, oxazole compound, triphenyl amine compound, and azine compound. Examples are: carbazole, N-ethyl carbazole, N-vinyl carbazole, N-isopropyl carbazole, N-phenyl carbazole, tetracene, chrysene, pyrene, perylene, 2-phenyl naphthalene, azapyrene, 2,3-benzochrysene, 3,4 benzopyrene, fluorene, 1,2-benzofluorene, 2,3-benzofluorene, 4-(2-fluorenylazo)m-cresol, 2-p-anisole aminofluorene, p-diethyl aminoazobenzene, 1-(2-thiazolylazo)-2-naphthol, 4-anisole aminoazobenzene, cadione, N,N-dimethyl-p-phenyl azoaniline, p-(dimethylamino)stylbene, 1,4-bis(2-methylstyryl)benzene, 9-(4-diethyl aminostyryl) anthracene, 2,5-bis(4-diethyl aminophenol)-1,3,5-oxadiazole, 1-phenyl-3-(p-diethyl aminostyryl)-5-(p-diethyl aminophenyl) pyrazoline, 1-phenyl-3-methyl-5-pyrazolon and 2-(m-naphthyl)-3-phenyl oxazole, and p-diethyl aminobenzaldehyde-(dephenyl hydrazone).

Such charge-transporting materials can be used singly or by mixing two or more kinds of them.

Any of the photosensitive members according to this invention can be provided, where necessary, with an adhesive layer or a barrier layer between the electroconductive substrate and the photosensitive layer. Materials suitable for such a layer are, for example, polyamide, nitrocellulose, and alluminum oxide, and are preferably used each in a thickness of not exceeding 1 μm.

A disazo compound provided by this invention exhibits its efficiency noticeably especially when used as a charge-generating material in a photosensitive member of the laminate type, as described with reference to examples below.

EXAMPLE 1

0.45 parts of disazo compound which were obtained from the coupling component (1) and diazo component A

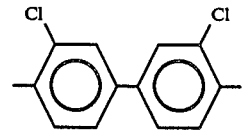

according to this invention and 0.45 parts of polyester resin (Vylon 200, made by Toyobo Inc.) were dispersed in 50 parts of cyclohexanone by means of a sand grinder. The preparation of the disazo compound thus obtained was coated onto an aluminized mylar with a thickness of 100 μm by means of a film applicator in such a manner as to form a film with a dry thickness of 0.3 g/m². Drying followed.

70 parts of p-diethylamino benzaldehyde - diphenyl hydrazone (DEH) and 70 parts of polycarbonate resin (K-1300, made by Teijin Kasei Co., Ltd.) were dissolved in 400 parts of 1,4-dioxane. This solution was coated on the charge-generating layer, which was formed at said preceding step, and a charge-transporting layer with a dry film thickness of 16 μm was formed. An electrophotographic photosensitive member which had a photosensitive layer consisting of two layers was thus obtained.

Table 1 shows the values of half-reduced exposure (E ½) as the sensitivities of the photosensitive members tested. The value of half-reduced exposure was determined by first charging the photosensitive member by corona discharge of −6.5 KV in the dark and then by exposing it to white light of 5 lux in illumination intensity to find the value required for a surface potential reduced to half the initial surface potential.

EXAMPLES 2–4

The same procedure as in Example 1 was followed, except that coupling components (2), (4) and (5) were used.

Table 1 shows the results.

EXAMPLES 5–10

The same procedure as in Example 1 was followed, except that a disazo component A

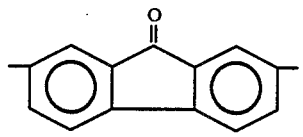

and coupling components (1), (5), (15), (16), (20) and (25) were used.

TABLE 1

Table 1 shows the results.

| Example | A | Coupling component | E ½ (lux sec) |
|---|---|---|---|
| 1 | Cl—⟨⟩—⟨⟩—Cl | 1 | 3.4 |
| 2 | Cl—⟨⟩—⟨⟩—Cl | 2 | 3.7 |
| 3 | Cl—⟨⟩—⟨⟩—Cl | 4 | 2.9 |
| 4 | Cl—⟨⟩—⟨⟩—Cl | 5 | 3.5 |
| 5 | fluorenone | 1 | 2.0 |
| 6 | fluorenone | 5 | 2.1 |
| 7 | fluorenone | 15 | 1.8 |
| 8 | fluorenone | 16 | 2.0 |
| 9 | fluorenone | 20 | 2.6 |
| 10 | fluorenone | 25 | 2.2 |

EXAMPLES 11–16

Photosensitive members were produced in the same manner as in Examples, except that as a disazo component A

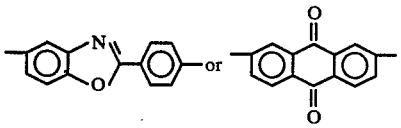

as a coupling component (1), (3), (7), (15), (5) or (8), and as a charge-transporting agent N-ethyl carbazole-3-aldehyde methyl phenylhydrazone (MPH) were used respectively. Table 2 shows the values of half-reduced exposure (E ½) of the photosensitive members tested. As is clear from the examples, the photosensitive member produced according to the present invention is invariably excellent in photosensitivity, and all of the new disazo pigments provided by the invention have been proved to be effective charge-generating material.

TABLE 2

| Example | A | Coupling component | E ½ (lux. sec.) |
|---|---|---|---|
| 11 | benzoxazole-phenyl | 1 | 4.3 |

TABLE 2-continued

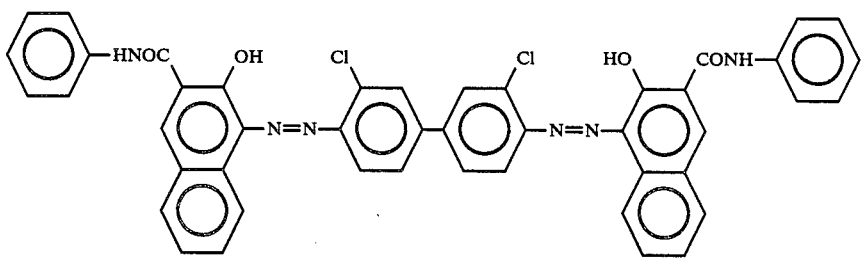

| Example | A | Coupling component | E ½ (lux. sec.) |
|---|---|---|---|
| 12 | 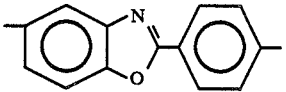 | 3 | 4.5 |
| 13 | 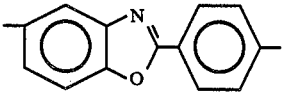 | 7 | 3.8 |
| 14 | 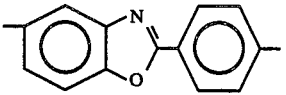 | 15 | 3.6 |
| 15 | 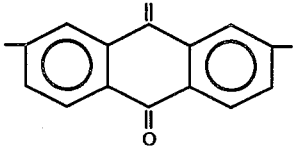 | 5 | 3.1 |
| 16 | 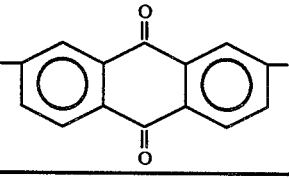 | 8 | 3.5 |

COMPARATIVE EXAMPLE 1

A photosensitive member was produced in the same manner as in Example 1, except that a charge-generating material expressed by the following formula was employed.

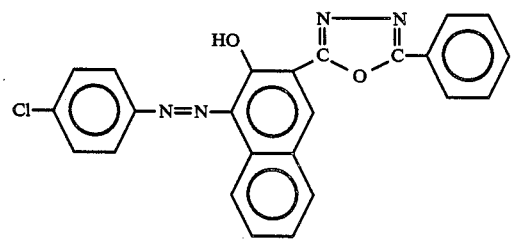

E ½ = 43.7 lux sec.

COMPARISON 2

A photosensitive member was produced in the same manner as in Example 1, except that a charge-generating material expressed by the following formula was employed.

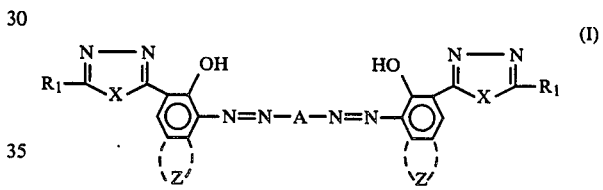

E ½ = 6.3 lux sec.

ADVANTAGE OF THE INVENTION

The present invention provides disazo pigments of a new kind which can be used as charge-generating substances of photosensitive members.

A photosensitive member produced according to the present invention is excellent in properties pertaining to photosensitive members, especially remarkable in sensitivity.

What is claimed is:

1. A photosensitive member having a photosensitive layer on an electroconductive substrate, said photosensitive layer containing a disazo pigment which is expressed by the following general formula (I)

$$R_1 \underset{X}{\overset{N---N}{\diagdown}} \underset{\underset{Z'}{|}}{\bigcirc} \underset{OH}{\overset{}{\diagdown}} -N=N-A-N=N- \underset{\underset{Z'}{|}}{\bigcirc} \underset{HO}{\overset{}{\diagdown}} \underset{X}{\overset{N---N}{\diagup}} R_1 \quad (I)$$

wherein: A represents an aromatic hydrocarbon group or heterocyclic group, which can be formed in a bond by means of a bonding group; Z represents a residual group which forms a polycyclic bond group/heterocyclic group by condensation with a benzene ring and which can have a substitution group; $R_1$ represents an alkyl group, aryl group or heterocyclic group, each of which can have a substitution group; and X represents a nitrogen atom which can have oxygen, sulfur, and/or a substitution group.

2. A photosensitive member of claim 1, in which the A is selected from the group consisting of benzene ring, diphenyl ring, anthraquinone ring, fluorenone ring, oxazol ring, carbazole ring, and oxadiazole ring.

3. A photosensitive member of claim 1, in which the $R_1$ is selected from the group consisting of phenyl, alkyl and/or alkoxy substituted-phenyl, chlorophenyl, nitrophenyl, biphenyl, naphthyl group, and 9-oxyfluorenyl.

4. A photosensitive member of claim 1, in which the group Z is selected from the group consisting of naphthyl, anthranyl, dibenzofuranyl, and dibenzocarbazolyl.

5. A photosensitive member of claim 1, in which the X is selected from the group consisting of O, S, N, alkyl substituted nitrogen, and phenyl substituted nitrogen.

6. A photosensitive member of claim 1, in which the thickness of the photosensitive layer is from 3 to 30 micron meter.

7. A photosensitive member of claim 1, in which the content of the disazo pigment is from 0.01 to 2 parts by weight based on one part by weight of a binder resin used for the photosensitive layer.

* * * * *